United States Patent [19]
Fouces et al.

[11] 3,791,181
[45] Feb. 12, 1974

[54] BRAKE LOCKING DEVICE FOR PREVENTING THEFT OF SELF-PROPELLED VEHICLES

[76] Inventors: Manuel Fouces; Juan M. Fouces, both of 2416 Mandell, Houston, Tex. 77006

[22] Filed: Feb. 8, 1972

[21] Appl. No.: 224,483

[52] U.S. Cl. .................................................. 70/202
[51] Int. Cl. ............................................... G05g 5/00
[58] Field of Search 70/202, 203, 193, 194; 74/109, 74/105, 102, 512, 530, 99 R; 188/265

[56] References Cited
UNITED STATES PATENTS
| | | | |
|---|---|---|---|
| 2,157,792 | 5/1939 | Koonce | 74/530 |
| 2,078,724 | 4/1937 | DuPuis | 70/202 |
| 2,103,089 | 12/1937 | Pichucki | 70/202 |

FOREIGN PATENTS OR APPLICATIONS
| | | | |
|---|---|---|---|
| 12,372 | 6/1905 | Great Britain | 188/265 |

*Primary Examiner*—James R. Boler
*Assistant Examiner*—Peter Nerbun
*Attorney, Agent, or Firm*—Torres and Berryhill

[57] ABSTRACT

A device for preventing the theft of a self-propelled vehicle, such as an automobile, may comprise a support carriage attached to the floorboard of the vehicle near its brake pedal and fastening apparatus carried by the support carriage, movable from a first position to a second position engaging the brake pedal and holding it in a depressed position. An operating assembly may be provided for moving the fastening apparatus to the second position. A lock may also be provided for engagement with the operating assembly to lock the fastening apparatus in the second position.

3 Claims, 4 Drawing Figures

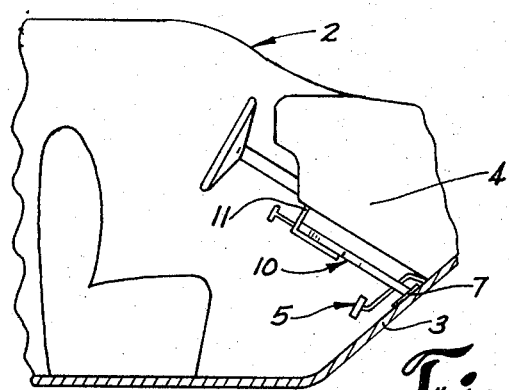
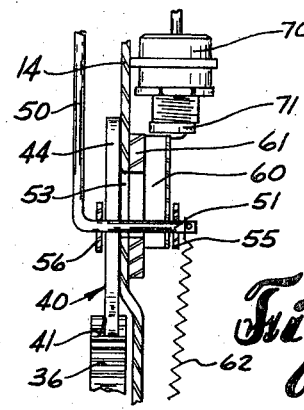
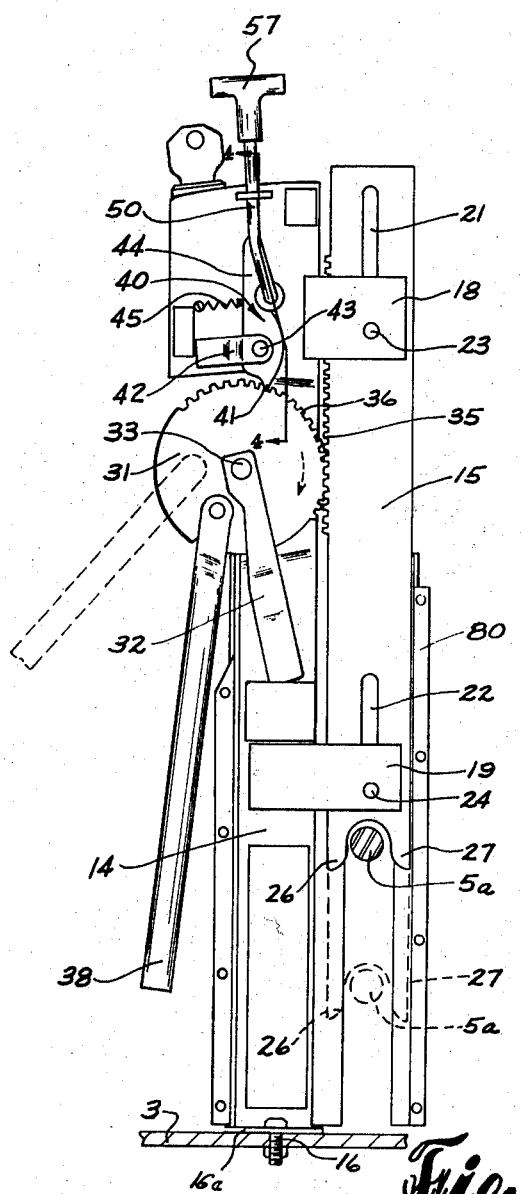
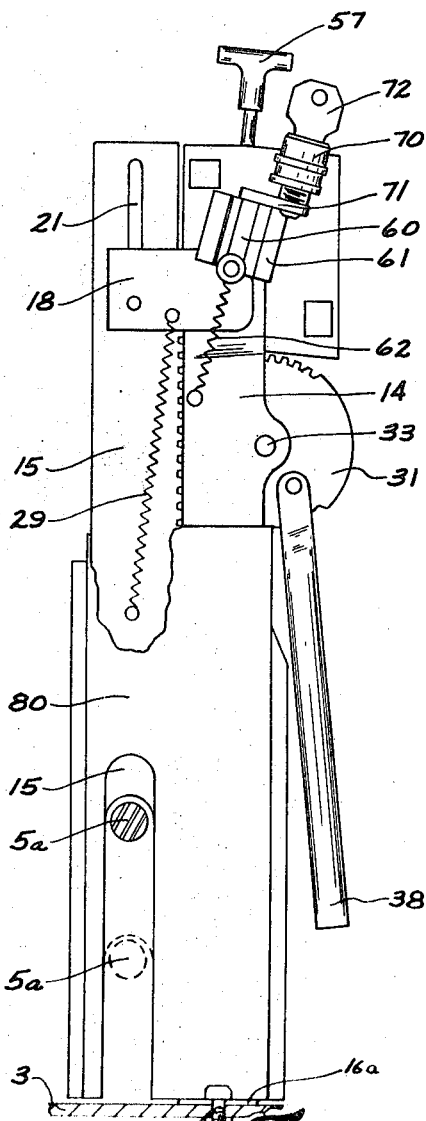

BRAKE LOCKING DEVICE FOR PREVENTING THEFT OF SELF-PROPELLED VEHICLES

BACKGROUND OF THE INVENTION

1. Field of the Invention

The present invention relates to anti-theft devices for self-propelled vehicles, such as automobiles, trucks, buses, tractors and the like. More specifically, it concerns a device for locking the brake pedal of a vehicle in a depressed position to prevent unauthorized use or theft thereof.

2. Description of the Prior Art

There appears to be an ever increasing rise in the unauthorized use or theft of self-propelled vehicles, particularly automobiles. Much of this is due to the carelessness of the vehicle owner in leaving his keys in the vehicle and/or failing to lock its doors. However, it is a simple matter for professional thieves to enter a locked vehicle and bypass the ignition lock. Even inexperienced persons are able to bypass the ignition lock with relative ease.

A number of anti-theft devices have been developed in the past few years. However, none has found such widespread acceptance as to be common. Many of these devices are designed to lock the vehicle accelerator pedal in a non-depressed position, preventing the flow of gasoline to the automobile engine. See U. S. Pat. Nos. 2,931,207-Fisher; 3,245,239-Zaidner; and 3,550,409-Pariser. Such a device does not, however, prevent the vehicle from being towed away. In fact, it does not even assure that the accelerator pedal might not be bypassed in some manner.

Other devices have been proposed for locking the brakes of a vehicle to prevent unauthorized use. However, such proposals have not met with success, because of the expense, complexity, bulkiness and inconvenient operation of these devices. Once such brake locking device is disclosed in U. S. Pat. No. 3,435,646-Michnoff.

Other self-propelled vehicle anti-theft devices have been proposed, but for various reasons have not found general acceptance either. The fact that so many of these devices have been developed is evidence of itself that a universally accepted method has not yet been found.

SUMMARY OF THE INVENTION

The present invention provides an easily installed anti-theft device for locking the brake pedal of a vehicle in the depressed position. It comprises a support carriage which is attached to the floorboard of the vehicle near the brake pedal. It may also be attached, in the case of an automobile or truck, to the dashboard. A bifurcated fastening rod is carried by the support carriage for reciprocation between first and second positions in the latter of which the rod engages and holds the brake pedal in a depressed position. An operating assembly is provided which includes a gear engageable with a toothed rack on the fastening rod. A lever may be attached to the gear for applying a torque thereto to drive the fastening rod to the aforementioned second position. The operating assembly also comprises a pawl engageable with the gear to prevent rotation in the opposite direction unless released by a release device. A key operated lock is provided for locking the release device so as to prevent rotation of the gear in the opposite direction and movement of the fastening rod to the unlocked first position.

The anti-theft device of the present invention is simple to install, simple to operate, and virtually theft-proof. No unusual or time consuming manipulation is required and locking is simply effected by pulling upwardly on the operating lever attached to the gear. Release is also simply performed by unlocking the key operated lock and pulling on a handle attached to the pawl release device. Other objects and advantages of the invention will become apparent from a reading of the description which follows in conjunction with the accompanying drawings.

BRIEF DESCRIPTION OF THE DRAWINGS

FIG. 1 is an elevation view of a preferred embodiment of the invention showing the device as it might be attached to the floorboard and dash of an automobile;

FIG. 2 is a top plan view showing the device as it might be viewed from underneath the automobile dash, with a portion of its housing removed;

FIG. 3 is a bottom plan view showing the device as it might be viewed from the floor of the automobile looking toward the dash; and FIG. 4 is a detailed section of the device, taken along line 4—4 of FIG. 2, showing the apparatus necessary for locking the device in the depressed brake pedal position.

DESCRIPTION OF A PREFERRED EMBODIMENT

Looking first at FIG. 1, the anti-theft device 10 of the present invention is shown as it might be installed in an automobile having a floorboard 3, a dash 4 and brake pedal 5. The anti-theft device 10 would be attached to the floorboard 3 at some point 7 near the brake pedal 5. It might also be attached by a suitable bracket 11 to the dash 4.

Referring also to the remaining drawings, FIGS. 2–4, the anti-theft device 10 will be described in detail. The entire device is supported by a generally elongated support carriage 14 which is attached to the automobile floorboard 3 in any suitable manner. In the embodiment shown, a mounting plate 16a and mounting bolts 16 are provided. The ends of bolts 16 may be braded underneath the floorboard to prevent disassembly therefrom.

Mounted along side the support carriage 14 for reciprocating movement relative thereto, is a fastening rod or strap 15. The rod 15 is mounted for sliding movement between an upper bracket 18 and a lower bracket 19 which may be welded to support member 14. Reciprocating of rod 15 is confined between an upper or first terminal position and a lower or second terminal position (see dotted lines) by the cooperation of upper and lower guide slots 21 and 22, respectively, in rod 15 and inter-engaging pins 23 and 24 of upper and lower brackets 18 and 19, respectively. The lower end of rod 15 is bifurcated and the bifurcations 26 and 27 project downwardly on opposite sides of the operating linkage or rod 5a of brake pedal 5. In the upper or first terminal position as shown in FIGS. 2 and 3, the brake pedal 5 is free to be depressed or non-depressed as the need may occur. When the rod 15 is reciprocated downwardly towards the lower or second terminal position, indicated by dotted lines, the brake pedal rod 5a and consequently brake pedal 5 are held in the depressed position and confined therein by the bifurcations 26 and 27. The rod 15 is normally biased toward the upper position by spring 29 attached at one end to rod 15 and at the opposite end to some part of the support carriage 14, bracket 18 as seen in FIG. 3.

To move the fastening rod 15 from the upper position to the lower position, in which the brake pedal is depressed, an operating assembly is provided which includes a gear member 31 attached to the support carriage for rotation thereon by a mounting bracket 32 and shaft 33. One edge of the fastening rod 15 is provided with a toothed rack 35 which is engaged by the teeth 36 of gear member 31. Attached to gear 31 for applying a rotating torque thereto, at a mechanical advantage, is an operating lever 38. By grasping the end of lever 38, the operator of the automobile may apply a torque to gear member 31. Rotation of gear 31 and the meshing of gear teeth 36 and rack teeth 35 causes the rod 15 to be driven downwardly towards the second position, as indicated by dotted lines, in which the brake pedal is held in a depressed position. If this position is maintained, the wheels of the automobile are locked making it impossible to move the vehicle and preventing unauthorized operation thereof.

To maintain the second or depressed pedal position, the operating assembly is provided with a pawl member 40 having a tooth 41 thereon engageable with gear teeth 36 to prevent rotation of gear member 31 in the opposite direction, counterclockwise as viewed in FIG. 2. The pawl 40 is mounted on a bracket 42 for rotation about a shaft 43. The pawl 40 has an arm portion 44 which is biased toward the right, as viewed in FIG. 2, by a compressed spring 45. However, the movement of arm 44 toward the right is limited by the engagement of arm 44 with a laterally extending portion 51 of a handle rod 50 which extends transversely through a slot 53 provided therefor in support carriage 14. (See FIG. 4). The handle rod 50 and its extension 51 also serves another function to be more fully understood hereafter. As long as gear member 31 is being rotated in a clockwise direction, as viewed in FIG. 2, the spring 45 allows pawl tooth 41 to alternately engage and disengage the teeth 36, but not preventing rotation of gear member 31. However, rotation in the opposite direction is prevented since the arm 44 rests against rod extension 51 preventing disengagement of pawl tooth 41 from any tooth 36 it may be in engagement with. Once the fastening rod 15 has been moved to the second position, holding the brake pedal in its depressed position, it is prevented from returning to the upper position by pawl 40.

To release the rod 15 from its downward depressed position, shown by dotted lines in FIGS. 2 and 3, it is necessary to provide a means for disengaging the pawl member 40 from gear teeth 36. This function may be served by the release rod 50. The lateral extension 51 of release rod 50 passes through the slot 53 in support member 14 and is attached to a guide block 60 which is in turn mounted for sliding movement within a guide bracket 61. The lateral extension 51 of release rod 50 and the guide block 60 are biased toward the lower position shown in FIGS. 2–4 by a spring member 62 which is attached at one end to the end of extension 51 and at the opposite end to support carriage 14. Washer 55 prevents removal of the rod 50 and washer 56 provides a shoulder against which the side of pawl 40 may ride.

As long as the rod 50 is in this lower position, the extension 51 thereof prevents the disengagement of pawl tooth 41 from teeth 36 and maintains the fastening rod 15 in the lower or depressed brake pedal position. However, this position may be released by pulling upwardly on the release rod handle 57. An upward pull on rod handle 57 causes the guide block 60 to ride upwardly within guide bracket 61. At the same time, the lateral extension 51 of rod 50 is riding upwardly in slot 53. The arm 44 of pawl member 40 is shaped in such a manner that the upward movement of the rod extension 51 cams the pawl in a counterclockwise direction, as viewed in FIG. 2, causing the pawl tooth 41 to disengage gear teeth 36. Since the fastening rod 15 is biased in an upwardly direction, the release of pawl 40 allows rotation of gear 31 in a counterclockwise position, as viewed in FIG. 2, and return of fastening rod 15 to the upper position.

Of course, if it is not prevented from doing so, release rod 50 may be pulled upwardly at any time to release the fastening rod 15. Therefore, a key operated lock 70 is provided to lock the release rod 50 in the downward position. This is accomplished by rotating a locking foot 71 with the key 72 to a position, as shown in FIGS. 3 and 4, engaging the upper end of guide block 60. Thus, the guide block 60 is prevented from reciprocating within guide bracket 61. Consequently, the lateral extension 51 of release rod 50 is also prevented from moving upwardly in slot 53 to cam the pawl 40 out of engagement with gear teeth 36. Only by turning the key 72, and consequently lock arm 71 is the release handle 50 allowed to be pulled upwardly.

Since the brake lights of some automobiles come on even when the ignition switch is off, an electric switch may be activated by the lock 70 to interrupt current to the brake lights. Alternately, a separate switch could be provided to interrupt current to the brake lights.

The lock 70 and all working parts of the operating assembly may be totally enclosed within a housing 80, a portion of which is shown removed in the drawings to allow a better understanding of the invention. The housing prevents tampering with the operating parts of the device and may be made in such a manner that the device is foolproof.

In summary, the support carriage 14 of the present invention is fixedly attached to the floorboard 3 of an automobile. By grasping the end of handle 38 and applying a rotating torque to gear member 31, the fastening rod 15 may be caused to reciprocate from an upper position to a lower position in which the bifurcations 26 and 27 lie on either side of the depressed brake pedal rod 5a, locking all wheels of the automobile. As long as the pawl member 40 engages gear teeth 36, this position is maintained. The lock 70 assures that the release rod 50 does not cause the pawl 40 to be disengaged. When it is desired to release the brake pedal from its depressed position, the key 72 is inserted into a lock 70 and rotated until the locking arm 71 is free of guide block 60, allowing release rod 50 to be pulled upwardly camming the pawl 40 out of engagement with gear teeth 36. The biasing spring 29 then automatically returns the fastening rod 15 to the upper or nondepressed brake pedal position. The vehicle is then free to be operated in its usual manner.

As can be seen from the foregoing description, the present invention is simple to manufacture, install and operate. It is virtually foolproof and provides a sure means by which a self-propelled vehicle may be placed in a condition which prevents unauthorized use or theft of the vehicle. Other objects and advantages of the invention will be apparent to those skilled in the art.

The embodiment described herein has been described for use with an automobile. It should be understood that it may be used with any self-propelled vehicle, e.g., trucks, buses, tractors or the like. Although only one embodiment of the invention has been described, many variations of the invention may be made without departing from the spirit thereof. It is therefore intended that the scope of the invention be limited only by the claims which follow.

We claim:

1. A device for preventing the theft of a self-propelled vehicle having a brake pedal and a floorboard therein comprising:
   a. support means attached to the floorboard of said vehicle near its brake pedal;
   b. rod means mounted on said support means for reciprocating movement between first and second positions, one end of said rod means being bifurcated for engagement with a portion of said brake pedal in said second position to hold said brake pedal in a depressed position, said rod means also including a tooth rack thereon;
   c. operating means including gear means engaging said tooth rack and being rotatable to drive said rod means from said first to said second position, said operating means also including pawl means engageable with said gear means and adapted to permit rotation of said gear means in the direction necessary for driving said rod means toward said second position and to prevent rotation in the opposite direction, said operating means further including release means engageable with said pawl means for disengagement of said pawl means from said gear means to allow rotation of said gear means in said opposite direction and permitting movement of said rod means toward said first position; and
   d. locking means engageable with said operating means to lock said rod means in said second position, said locking means including a key operated lock engageable with said release means to prevent said disengagement of said pawl means from said gear means.

2. The device of claim 1 characterized by biasing means attached to said rod means biasing said rod means toward said first position.

3. The device of claim 1 in which said operating means comprises lever means attached to said gear means for applying a rotating torque thereto.

* * * * *